United States Patent
Kim et al.

(10) Patent No.: US 9,100,984 B2
(45) Date of Patent: Aug. 4, 2015

(54) WIRELESS CHANNELIZATION

(71) Applicant: QUALCOMM Incorporated, San Diego, CA (US)

(72) Inventors: Youhan Kim, Albany, CA (US); Adrian H. Chadd, San Jose, CA (US); Michael R. Green, Needham, MA (US); Ning Zhang, Saratoga, CA (US); Vincent K. Jones, IV, Redwood City, CA (US)

(73) Assignee: QUALCOMM Incorporated, San Diego, CA (US)

(*) Notice: Subject to any disclaimer, the term of this patent is extended or adjusted under 35 U.S.C. 154(b) by 307 days.

(21) Appl. No.: 13/801,632

(22) Filed: Mar. 13, 2013

(65) Prior Publication Data

US 2013/0265907 A1    Oct. 10, 2013

Related U.S. Application Data

(60) Provisional application No. 61/620,391, filed on Apr. 4, 2012.

(51) Int. Cl.
| | |
|---|---|
| H04L 12/28 | (2006.01) |
| H04W 88/06 | (2009.01) |
| H04W 88/08 | (2009.01) |
| H04L 5/00 | (2006.01) |
| H04W 48/12 | (2009.01) |
| H04W 76/02 | (2009.01) |
| H04W 88/10 | (2009.01) |
| H04W 72/04 | (2009.01) |

(52) U.S. Cl.
CPC ............ *H04W 88/06* (2013.01); *H04L 5/0044* (2013.01); *H04L 5/0064* (2013.01); *H04L 5/001* (2013.01); *H04W 48/12* (2013.01); *H04W 72/048* (2013.01); *H04W 76/025* (2013.01); *H04W 88/08* (2013.01); *H04W 88/10* (2013.01)

(58) Field of Classification Search
None
See application file for complete search history.

(56) References Cited

U.S. PATENT DOCUMENTS

2008/0311852 A1    12/2008  Hansen et al.
(Continued)

FOREIGN PATENT DOCUMENTS

EP    1670182 A1    6/2006

OTHER PUBLICATIONS

Partial International Search Report—PCT/US2013/034186—ISA/EPO—Jul. 1, 2013.
International Search Report and Written Opinion—PCT/US2013/034186—ISA/EPO—Sep. 30, 2013.
(Continued)

*Primary Examiner* — Kwang B Yao
*Assistant Examiner* — Adam Duda
(74) *Attorney, Agent, or Firm* — Holland & Hart LLP (57) ABSTRACT

A wireless device may be configured to operate in one of two modes where each mode uses a different channel list to perform operations in accordance with the IEEE 802.11 standard. In a first mode, the wireless device operates as an access point that sets up channels using one channel list in order to facilitate communications within a basic service set (BSS). In a second mode, the wireless device uses a second channel list to operate as a station and scan for a BSS. The first channel list contains a subset of the channels contained in the second channel list. The channels in each respective channel list may be reconfigured to adapt to changes in the configuration of a BSS and the devices communicating therein.

42 Claims, 10 Drawing Sheets

(56) References Cited

U.S. PATENT DOCUMENTS

| | | |
|---|---|---|
| 2011/0096747 A1 | 4/2011 | Seok |
| 2011/0110349 A1 | 5/2011 | Grandhi |
| 2012/0009888 A1 | 1/2012 | Smadi |
| 2012/0069746 A1 | 3/2012 | Park |
| 2012/0076049 A1 | 3/2012 | Rudolf et al. |
| 2012/0163356 A1 | 6/2012 | Shapira et al. |

OTHER PUBLICATIONS

Perahia E., et al., "Gigabit Wireless LANs," ACM SIGMOBILE Mobile Computing and Communications Review, vol. 15, No. 3, Nov. 29, 2011, pp. 23-33, XP055015658, ISSN: 1559-1662, DOI: 10.1145/2073290.2073294, paragraphs [001.], [011.], [11.A.].

Iesswire AG, "Universal Embedded WLAN Solution for OEM Customers," WiBear—Industrial Universal WLAN Front End Module (IEEE 802.11b/g), Aug. 2011, pp. 1-4.

| TABLE 602 – 802.11 SETTINGS | | |
|---|---|---|
| HT OPERATION ELEMENT STA CHANNEL WIDTH FIELD | VHT OPERATION ELEMENT STA CHANNEL WIDTH FIELD | BSS OPERATING CHANNEL WIDTH |
| 0 | 0 | 20 MHz |
| 1 | 0 | 40 MHz |
| 1 | 1 | 80 MHz |
| 1 | 2 | 160 MHz |
| 1 | 3 | 80 + 80 MHz |

| TABLE 608 - PROPOSED SETTINGS | | |
|---|---|---|
| HT OPERATION ELEMENT STA CHANNEL WIDTH FIELD | VHT OPERATION ELEMENT STA CHANNEL WIDTH FIELD | BSS OPERATING CHANNEL WIDTH |
| 0 | 0 | 20 MHz |
| 1 | 0 | 40 MHz |
| X | 1 | 80 MHz |
| X | 2 | 160 MHz |
| X | 3 | 80 + 80 MHz |

*FIG. 6*

TABLE 702 - PROPOSED SETTINGS

| VHT OPERATION ELEMENT STA CHANNEL WIDTH FIELD | BSS OPERATING CHANNEL WIDTH |
|---|---|
| 0 | 20 MHz |
| 1 | 40 MHz |
| 2 | 80 MHz |
| 3 | 160 MHz |
| 4 | 80 + 80 MHz |

WIRELESS CHANNELIZATION

RELATED APPLICATIONS

This application claims priority under 35 U.S.C. §119(e) to U.S. Provisional Application Ser. No. 61/620,391, entitled "Setting Up And Searching For BSS For 802.11a/n And 802.11ac," filed on Apr. 4, 2012, which is herein incorporated by reference in its entirety.

BACKGROUND

The IEEE 802.11 standards are used to formulate wireless local area networks (WLAN) within a radio frequency (RF) band. The radio spectrum is regulated by a regulatory authority in each country. In the United States, the Federal Communications Commission (FCC) regulates the radio spectrum. The FCC has regulated the Industrial, Scientific, and Medical (ISM) band and the Unlicensed National Information Infrastructure (U-NII) bands (e.g., U-NII-1, U-NII-2A, U-NII-2C, U-NII-3) for WLAN and mobile communications. The FCC regulates the available channels within a RF band and the key requirements for transmissions. The IEEE 802.11 standards specify a communication protocol that attempts to achieve the maximum data rate within the available channels.

Over the years, the IEEE 802.11 standards have evolved with each new standard aimed at increasing the transmission data rate by offering additional features, such as faster increased channel widths and multiple spatial streams. In some standards, such as the IEEE 802.11ac standard, an additional channel was added to the radio band thereby offering additional 20 MHz, 40 MHz, 80 MHz and 160 MHz channels. However, the advantages offered by each new standard may not be available to legacy devices still operational within a wireless network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A wireless network operating in accordance with the IEEE 802.11 radio protocol maintains operability with legacy wireless devices configured to operate in accordance with legacy versions of the 802.11 standard that do not recognize larger capacity channels. The 802.11ac standard recognizes channel 144 in the U-NII-2C radio frequency band which generated new 20 MHz, 40 MHz, 80 MHz and 160 MHz channels. Legacy stations (e.g., 802.11a/n devices) may not scan for a basic service set (BSS) in channel 144 or recognize communications transmitted on channel 144. Access points which set up a BSS need to avoid the use of channel 144 with legacy devices while allowing devices that recognize channel 144 to utilize the larger capacity channels made possible with the use of channel 144.

In one or more embodiments, a wireless device maintains a first channel list for use when operating as an access point and a second channel list when operating as a non-access point station or station. The second channel list may include all the channels in a radio band and the first channel list may include a subset of the channels in the second channel list. The wireless device, acting in the capacity of an access point, utilizes the first channel list to set up a basis service set (BSS). The wireless device, acting in the capacity of a non-access point station, utilizes the second channel list to search for a BSS to associate with.

The channels in each channel list may be reconfigured, either through a software update or dynamically by monitoring communications made with a BSS. A device may track the radio protocol that a wireless device uses in its communications (e.g., 802.11a, 802.11n, 802.11ac), the existence of proprietary messages in its communications, and the features used in the communications. In this manner, the channel lists may be reconfigured to adapt to changes in the capabilities of the devices communicating within the BSS.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

The various embodiments describe techniques that maintain interoperability between legacy and non-legacy devices in a BSS where the devices support different channel widths within a same radio protocol (IEEE 802.11).

Figure 1:
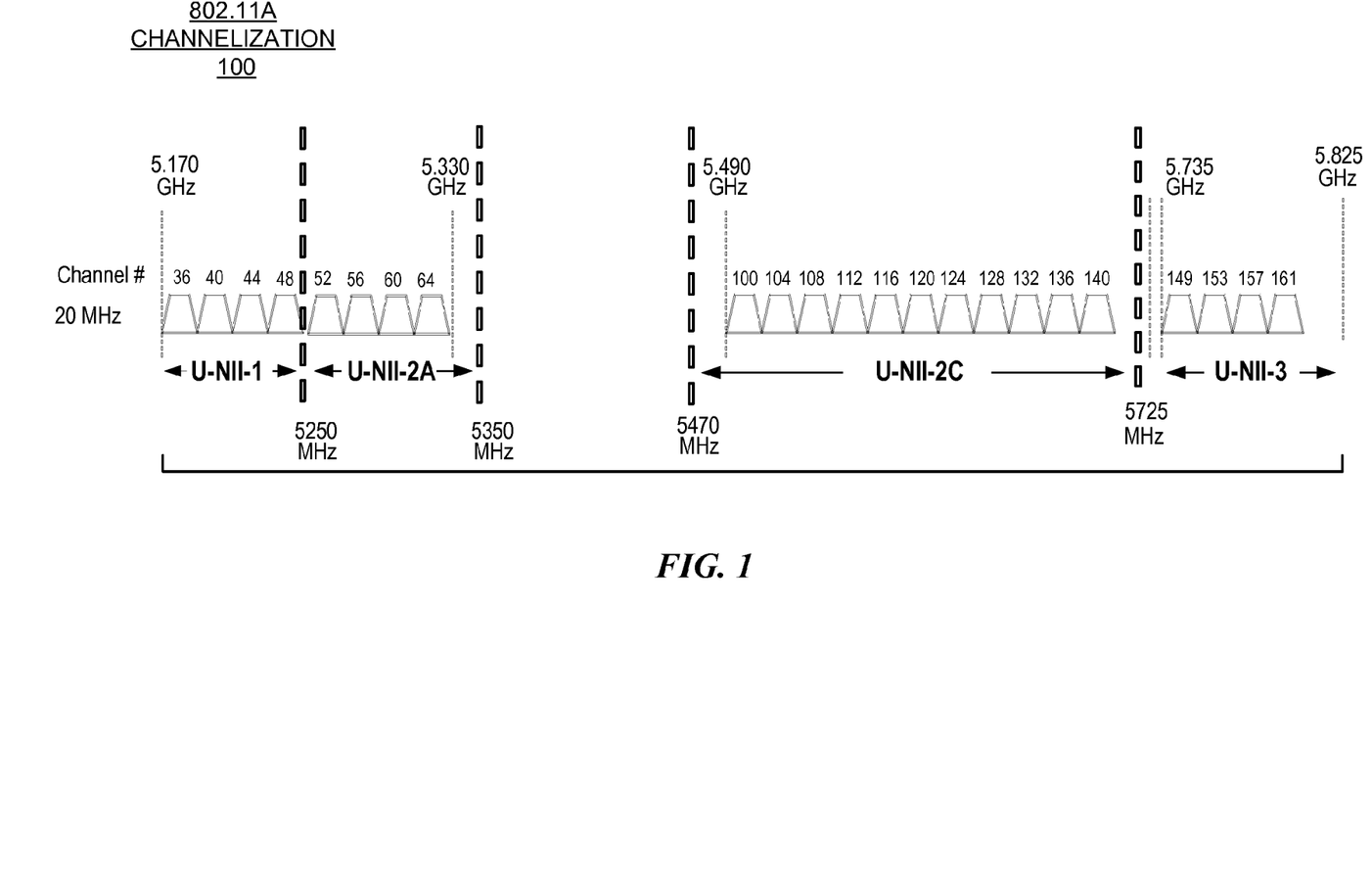
FIG. 1 is a block diagram illustrating the radio spectrum in the United States supported by the IEEE 802.11a standard.

FIG. 1 is a block diagram illustrating the radio spectrum 100 in the United States (US) supported by the IEEE 802.11a standard, otherwise referred to as 802.11a channelization. The IEEE 802.11a standard specifies a data rate up to 54 Mbits/second using the 5 GHz radio band. In the United States, the 5 GHz radio band is a conglomerate of three bands: 5.170 to 5.250 GHz (U-NII-1); 5.250 to 5.350 GHz (U-NII-2A); and 5.725 to 5.835 GHz (U-NII-3). The 5 GHz band contains 20 MHz channels 36, 40, 44, and 48 in U-NII-1; 20 MHz channels 52, 56, 60, 64 in U-NII-2A; 20 MHz channels 100, 104, 108, 112, 116, 120, 124, 128, 132, 136, and 140 in U-NII-2C; and 20 MHz channels 149, 153, 157, 161 in U-NII-3.

Figure 2:
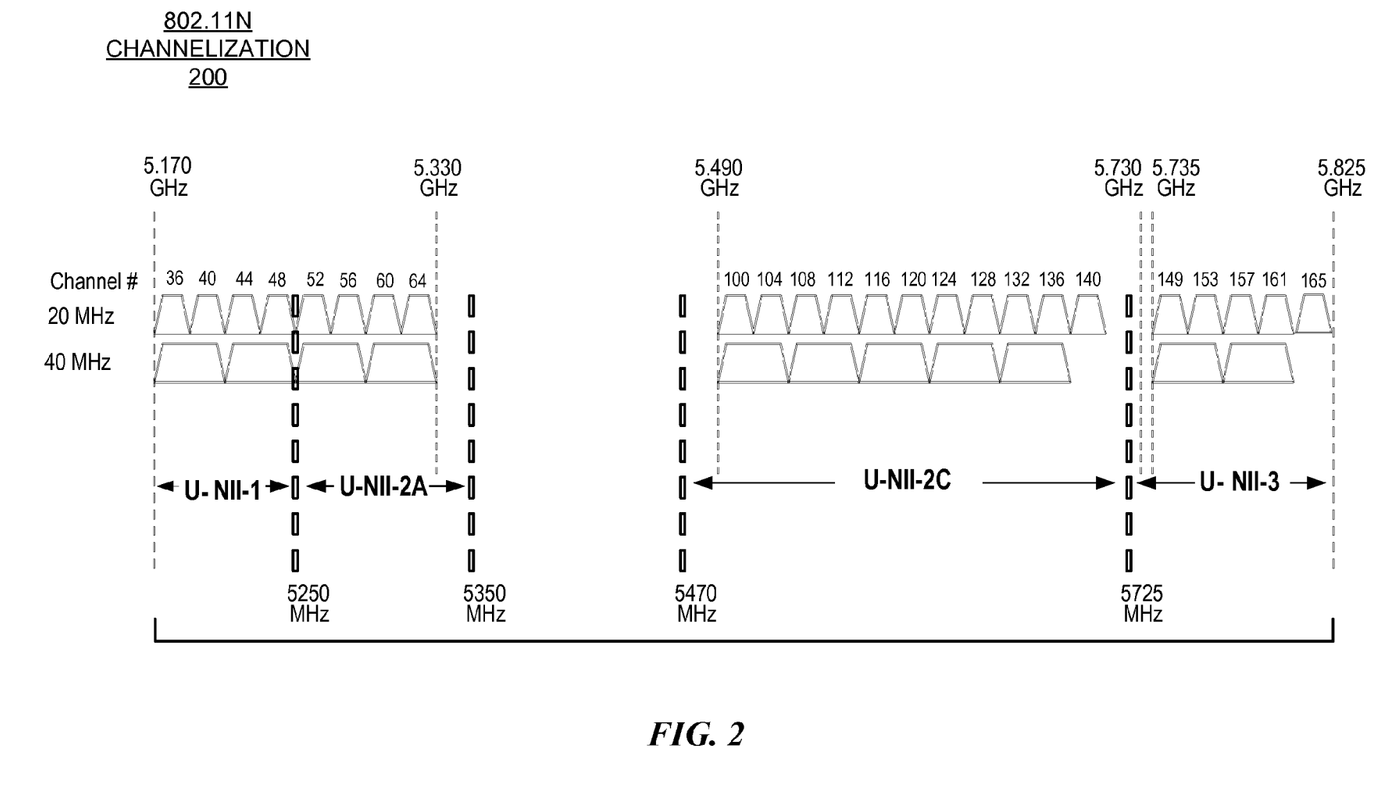
FIG. 2 is a block diagram illustrating the radio spectrum in the United States supported by the IEEE 802.11n standard.

FIG. 2 is a block diagram illustrating the radio spectrum 200 in the US supported by the IEEE 802.11n standard, otherwise referred to as the 802.11n channelization. The IEEE 802.11n standard specifies a data rate greater than 100 Mbits/second that operates in the 2.4 GHz radio band and in the 5 GHz band. The IEEE 802.11n standard is often referred to as High Throughput (HT) since the standard supports 20 MHz channels in the 2.4 GHz and 40 MHz channels in the 5 GHz band. The 20 MHz channels in the 2.4 GHz band are used for backwards compatibility with IEEE 802.11a/g devices. A 40 MHz channel is two adjacent 20 MHz channels treated as a single 40 MHz channel. A 40 MHz channel is configured with a 20 MHz primary channel and a secondary 20 MHz channel spaced ±20 MHz away from the primary channel.

As shown in FIG. 2, the IEEE 802.11n standard supports the following 20 MHz channels: 36, 40, 44, and 48 in U-NII-1; channels 52, 56, 60, 64 in U-NII-2A; channels 100, 104, 108, 112, 116, 120, 124, 128, 132, 136, and 140 in U-NII-2C; and channels 149, 153, 157, 161, and 165 in U-NII-3. The 40 MHz channels may be configured as the following adjacent pairs of 20 MHz channels as follows: 36/40; 44/48 in U-NII-1; 52/56, 60/64 in U-NII-2A; 100/104, 108/112, 116/120, 124/128, 132/136 in U-NII-2C; and 149/153, 157/161 in U-NII-3.

The IEEE 802.11ac standard increases the channel bandwidth to 80 MHz and to an optional 160 MHz channel. Adjacent 20 MHz channels are aggregated to form a single 40 MHz channel, adjacent 40 MHz channels are aggregated to form a single 80 MHz channel and adjacent 80 MHz channels are aggregated to form a single 160 MHz channel. In order to support the increased bandwidth, the radio spectrum is increased in the 5.725-5.730 GHz band to include an additional 20 MHz channel, channel 144 resulting in additional 40 MHz, 80 MHz and 160 MHz channels.

Figure 3:
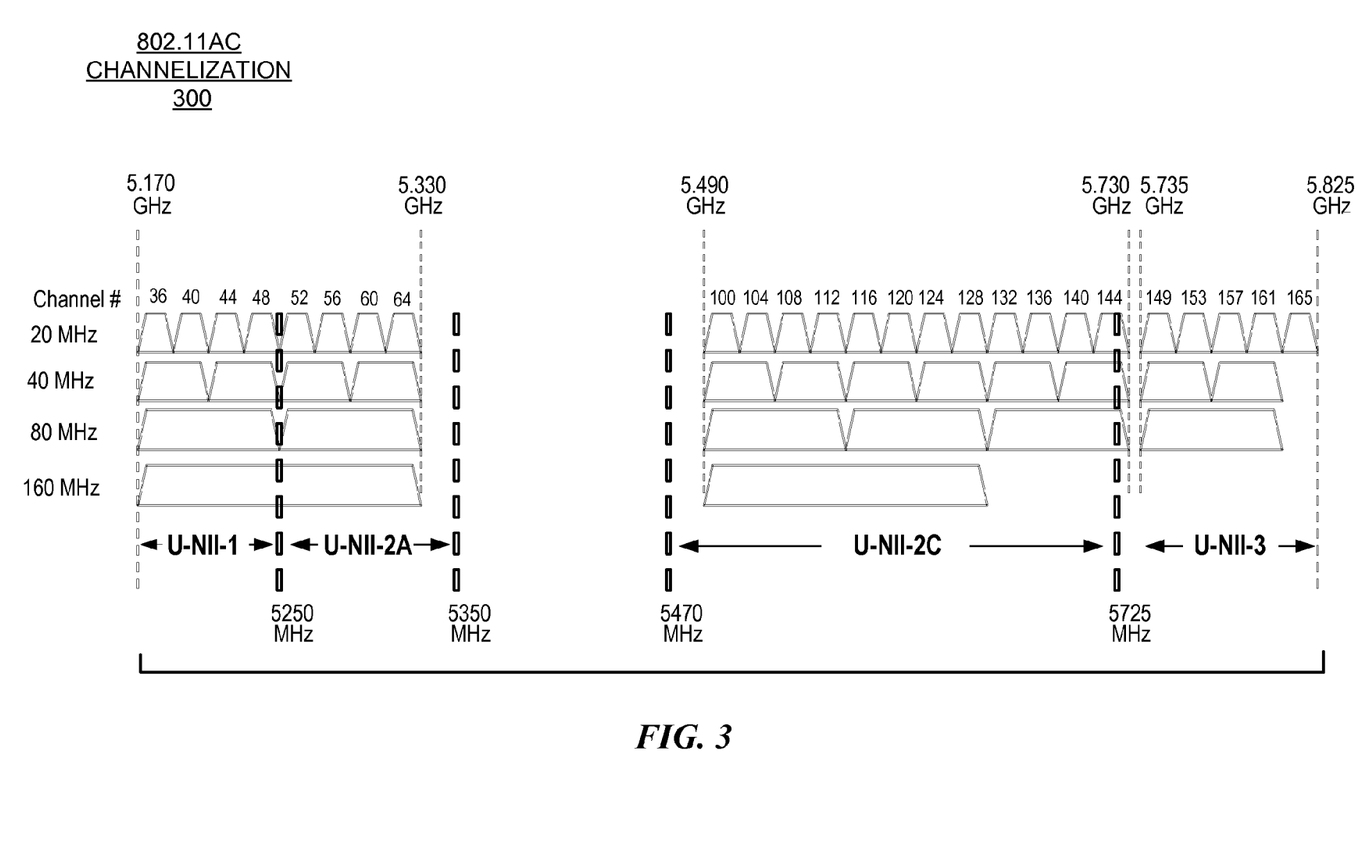
FIG. 3 is a block diagram illustrating the radio spectrum in the United States supported by the IEEE 802.11ac standard.

FIG. 3 is a block diagram illustrating the radio spectrum 300 in the US supported by the IEEE 802.11ac standard, otherwise referred to as 802.11ac channelization. The IEEE 802.11ac standard is often referred to as Very High Throughput (VHT) since it supports 80 MHz and 160 MHz channels in addition to 20 MHz and 40 MHz channel widths.

The IEEE 802.11ac standard supports the following 20 MHz channels: 36, 40, 44, and 48 in U-NII-1; channels 52, 56, 60, 64 in U-NII-2A; channels 100, 104, 108, 112, 116, 120, 124, 128, 132, 136, 140, and 144 in U-NII-2C; and channels 149, 153, 157, 161, and 165 in U-NII-3. The 40 MHz channels may be configured as the following adjacent pairs of 20 MHz channels as follows: 36/40; 44/48 in U-NII-1; 52/56, 60/64 in U-NII-2A; 100/104, 108/112, 116/120, 124/128, 132/136, 140/144 in U-NII-2C; and 149/153, 157/161 in U-NII-3. The 80 MHz channels may be configured as adjacent pairs of 40 MHz channels as follows: 36/40/44/48 in U-NII-1; 52/56/60/64 in U-NII-2A; 100/104/108/112, 116/120/124/128, 132/136/140/144 in U-NII-2C; and 149/153/157/161 in U-NII-3. The 160 MHz channels may be configured as adjacent pairs of 80 MHz channels as follows: 36/40/44/48/52/56/60/64 in U-NII-1 and U-NII-2A; and 100/104/108/112/116/120/124/128 in U-NII-2C. Note that the IEEE 802.11ac standard includes channel 144, which is not included in the IEEE 802.11a and IEEE 802.11n standards, thereby allowing the IEEE 802.11ac standard to support 20 MHz channel 144 and 40 MHz channel 140/144 (which were not available in the IEEE 802.11a and IEEE 802.11n standards).

Although the 802.11ac standard added an additional channel to the radio spectrum to increase the channel bandwidth and data rate, some legacy wireless devices may not be aware of channel 144 and as such, ignore communications transmitted on that channel. This situation is not constrained to the 802.11ac standard. Additional channels may be added in the future to a radio band thereby creating a need to maintain interoperability with legacy devices. Although some embodiments are described with respect to addition of channel 144 in 802.11ac, the embodiments are not limited in this manner. The embodiments may be applied to additional channels added in to any IEEE 802.11 standard.

In a first embodiment, a technique is described which addresses interoperability within a WLAN operating in accordance with the IEEE 802.11ac standard with legacy devices operating in accordance with the IEEE 802.11a and 802.11n standards. This technique consists of two parts. The first part has an 802.11ac access point set up a BSS by avoiding the use of channel 144 for legacy devices that do not recognize channel 144. The second part has a station interpret the signaling protocol that advertises the capabilities of an access point differently than the method described in the standard.

In accordance with the first part of the first embodiment, an access point setting up a BSS limits the assignment of channel 144 in certain situations. In particular, an access point operating in accordance with the 802.11ac standard avoids setting up any BSS using channel 144 as the primary channel, avoids setting up a 40 MHz BSS using channel 144 as the secondary 20 MHz channel (e.g., avoids setting up a 40 MHz BSS with 20 MHz channel 140 specified as the primary channel and channel 144 specified as the secondary channel), and avoids setting up an 80 MHz BSS using channel 144 as the secondary 20 MHz channel. (e.g., avoids setting up an 80 MHz BSS with 20 MHz channels 132/136/140/144, wherein channel 140 is specified as the primary channel and channel 144 is specified as the secondary channel). The reason that these configurations are avoided is because a legacy 802.11a/n station receiving these channel assignments will not know how to interpret these channel assignments. Channel assignments are made in this manner, to be backwards compatible with the legacy standards that do not utilize channel 144.

In accordance with the second part of the first embodiment, the 802.11 standard signaling protocol used to specify the channel assignments may be interpreted differently, thereby allowing a access point (AP) to advertise a 802.11ac BSS capable of supporting channel widths of 80 MHz or 160 MHz for 802.11ac stations, while simultaneously supporting a HT BSS capable of supporting a channel width of 20 MHz for 802.11n stations. This signaling protocol ensures that 802.11ac stations may utilize the larger channel widths supported by the VHT BSS while the 802.11n legacy devices operate as designed.

In accordance with the second part of the first embodiment, 802.11ac and 802.11n stations will interpret the bits in the STA channel width field of the HT Operation Element and the STA channel width field of the VHT Operation Element in a different manner than the interpretation set forth in the 802.11ac standard. The bits in these channel width fields are set by the access point and transmitted to a station in a beacon frame or probe response. An 802.11n station interprets the HT Operation Element to determine the channel widths supported by an access point. An 802.11ac station uses the channel width fields of both the HT Operation Element and the VT Operation Element to determine the channel widths supported by an access point. The signaling protocol enables an 802.11n station to interpret these bits as an 802.11ac access point setting up a 20 MHz or 40 MHz channel BSS. The 802.11ac station interprets the same bits to recognize the full capacity of the BSS, that is, 20 MHz, 40 MHz, 80 MHz, or 160 MHz channels. The manner in which 802.11a/n and 802.11ac stations re-interpret the bits of the channel width fields of the HT and VHT Operation Elements is described in more detail below in connection with FIGS. 5A-5B.

In a second embodiment, a technique is described which maintains interoperability between 802.11 a/n legacy devices and the 802.11ac channelization without re-interpreting the signaling protocol. In this embodiment, an access point avoids using channel 144 as the primary 20 MHz channel and avoids channel 144 for use as a secondary 20 MHz channel for a 40/80 MHz BSS (in the same manner as the first part of the first embodiment). However, in the second embodiment, the stations and access points adhere to the requirements of the respective IEEE 802.11 standard without deviation (i.e., the second part of the first embodiment is not followed).

In a third embodiment, a technique is described which maintains interoperability between 802.11 devices in a BSS by utilizing separate channel lists for access points and stations. When a device operates as an access point, the device uses a channel list having the channels that are recognized by all devices. As such, the channels in the list will be a subset of the channels available in the radio band. When the device operates as a station, the device uses a second channel list having all the channels that are supported in a radio band.

In a fourth embodiment, the channel lists may be changed from time to time to adapt to changes in the configuration of the BSS and the devices utilizing the channel lists. For example, as legacy devices become extinct, the channel list used for setting up a BSS may include all the channels supported by the radio band. As new channels are added to the radio band, the new channels may be added to the channel list used by the station and not included in the channel list used by an access point.

Figure 4:
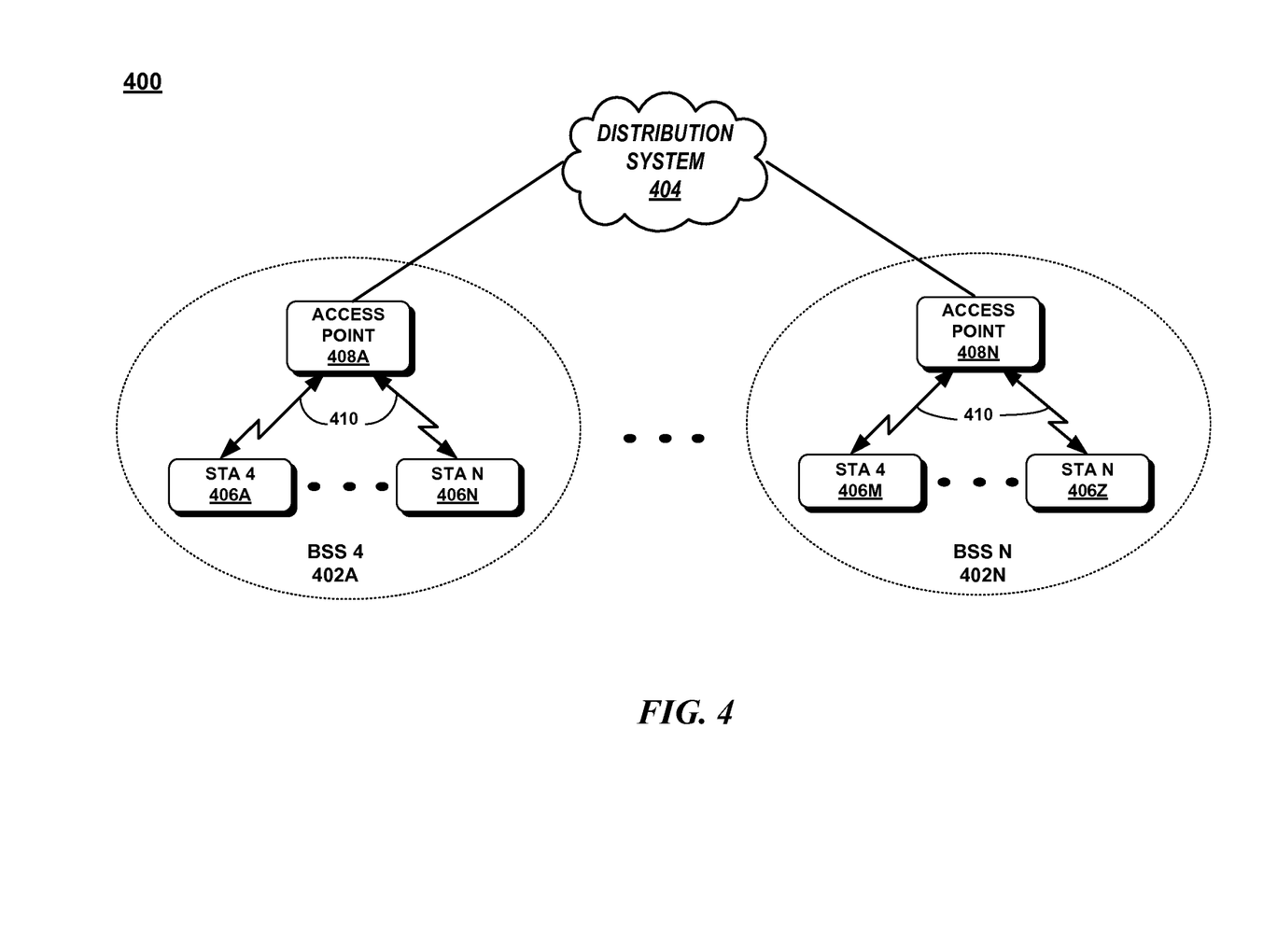
FIG. 4 illustrates an exemplary wireless network system.

Attention now turns to a general discussion of a wireless network operating in accordance with an IEEE 802.11 communication protocol. FIG. 4 illustrates a block diagram of an exemplary wireless local area network (WLAN) 400 configured to implement an IEEE 802.11 communication protocol. The network 400 may be configured with one or more basic service sets (BSSs) 402A, 402N (collectively, "402") coupled to a distribution system 404. Each BSS 402A, 402N may include several stations (STAs) 406A-406Z (collectively, "406") and an access point (AP) 408A, 408N communicatively coupled wirelessly through a wireless medium 410. An access point is a station operating as a coordinator of the BSS. A station within the BSS may communicate with other stations within the BSS. A BSS may be configured as an independent BSS where stations communicate with other stations within direct communication range of each other. Alternatively, a BSS may be configured as an infrastructure BSS where all communications are relayed through an access point. The distribution system 404 provides the communication means for an access point to communicate with other access points in order to deliver frames for a station within its respective BSS. The distribution system 404 may be a wired network or a dedicated device that serves as a bridge to a backbone network.

A station, including an access point, may be any type of electronic device capable of executing programmable instructions such as, without limitation, a mobile device, a personal digital assistant, a mobile computing device, a smart phone, a cellular telephone, a handheld computer, a server, a server array or server farm, a tablet, a web server, a network server, an Internet server, a work station, a mini-computer, a mainframe computer, a supercomputer, a network appliance, a web appliance, a distributed computing system, multiprocessor systems, or combination thereof.

In an infrastructure BSS, an access point controls access to a BSS. A station associates with an access point to receive network services. A station may use a passive scan to find BSSs within range of the station by receiving beacon frames transmitted by access points within its area. An access point transmits beacon frames, to the channels operating within a radio band, at regular intervals to announce the existence and capabilities of the BSS.

Alternatively, a station may actively scan for a BSS operating within its listening area by transmitting a probe request on each known channel. An access point may respond to the station with a probe response indicating the existence and capabilities of the BSS.

A station associates with an access point to obtain network services by transmitting an association request to an access point meeting a station's capabilities. The association request includes the station's capabilities, such as the channel bandwidths that the station supports. The access point verifies the information included in the request before accepting the station's request. The access point responds with an association response that includes the primary and/or secondary channels used to communicate with the BSS. A station makes a reassociation request to associate with an access point when the station moves between BSSs within a same extended service area. The reassociation request includes the station's capabilities and the access point may respond with a reassociation response indicting a primary and/or secondary channel used to communicate with the BSS.

Attention now turns to a discussion on the operations for the embodiments with reference to an exemplary method. It may be appreciated that the representative method does not necessarily have to be executed in the order presented, or in any particular order, unless otherwise indicated. Moreover, various activities described with respect to the method can be executed in serial or parallel fashion, or any combination of serial and parallel operations. The method can be implemented using one or more hardware elements and/or software elements of the described embodiments or alternative embodiments as desired for a given set of design and performance constraints. For example, the methods may be implemented as logic (e.g., program instructions, firmware) for execution by a logic device (e.g., a radio unit or specific-purpose processor).

Figure 5A:
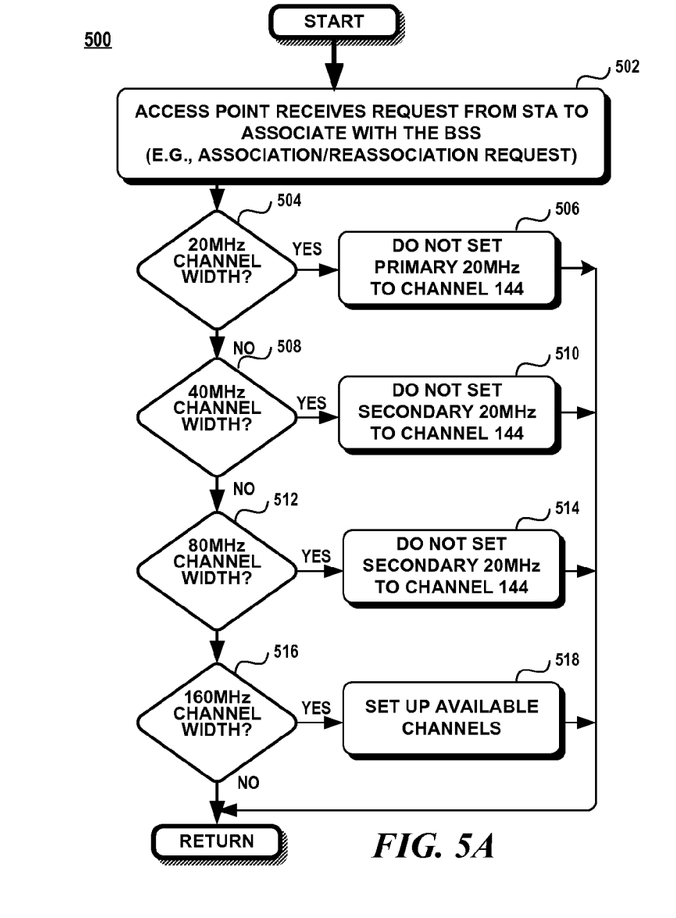
FIGS. 5A-5B are flow diagrams illustrating a first embodiment of an exemplary method for maintaining interoperability with legacy devices in a wireless network.
Figure 5B:
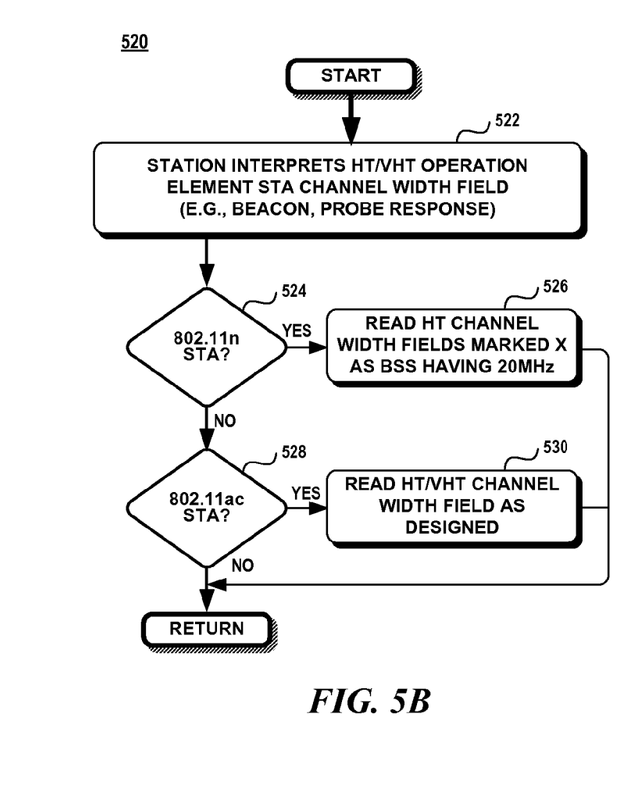

FIGS. 5A-5B illustrate an exemplary method that maintains interoperability within an 802.11ac BSS with 802.11a/n legacy devices. FIG. 5A illustrates an exemplary method 500 used by an access point to set up the BSS with 802.11a/n/ac devices. FIG. 5B illustrates an exemplary method 520 used by a station to determine the channel widths supported by a BSS. It should be noted that the methods 500, 520 shown in FIGS. 5A-5B may be representative of some or all of the operations executed by one or more embodiments described herein and that the method can include more or less operations than that which is described.

An access point may receive an association or a reassociation request from a station. The association/reassociation request includes a Capabilities Element that includes a Supported Channel Width Set subfield that indicates the channel widths supported by a station. An 802.11a station refers to this field as a Capabilities Element, an 802.11n device station refers to this field as a HT Capabilities Element, and an 802.11ac station refers to this field as a VHT Capabilities Element. The bit settings in each respective Supported Channel Width Set subfield indicate the channel widths supported by the station.

In response to an association/reassociation request, the access point returns an association/reassociation response with the respective Operation Element indicating the channel number the BSS is operating on. The operation of a station is controlled by the bit settings in the Operation Element. If the Supported Channel Width field of a respective Capabilities Element indicates that the station supports a 20 MHz channel width, then the Primary Channel field of a respective Operation Element indicates the 20 MHz channel number the BSS is operating on. For a HT station that supports a 40 MHz channel width, then the Primary Channel field of a HT Operation Element indicates the 20 MHz channel number and the Secondary Channel Offset field of the HT Operation Element indicates the position of the secondary channel relative to the primary channel. A VHT station gets the primary and secondary channel information from the VHT Operation Information field of the VHT Operation Element (e.g., Channel Center Frequency Segment 1 and Channel Center Frequency Segment 2)

Turning to FIG. 5A, an access point may receive an association/reassociation request to associate with a BSS (block 502). If the station supports only a 20 MHz channel width (block 504), then the access point encodes the bits of the respective Operation Element to avoid using channel 144 as the primary channel (block 506). If the station supports only a 40 MHz channel width (block 508), then the access point encodes the bits of the respective Operation Element to avoid using channel 144 as the secondary channel (block 510). If the station supports an 80 MHz channel width (block 512), then the access point encodes the bits of the VHT Operation Element to avoid using channel 144 as the secondary channel (block 514). If the station supports a 160 MHz channel width (block 516), then the access point encodes the bits of the VHT Operation Element for the station to use such an available channel (block 518).

A station associates with an access point that can support the station's capabilities. An access point advertises its capabilities, such as the supported channel widths, in a beacon frame or probe response. An access point operating in accordance with the 802.11ac standard formats a beacon frame or probe response with the STA channel width field of the HT Operation Element and VT Operation Element set appropriately. A station reads these bits to determine the channel widths supported by the BSS.

Figure 6:
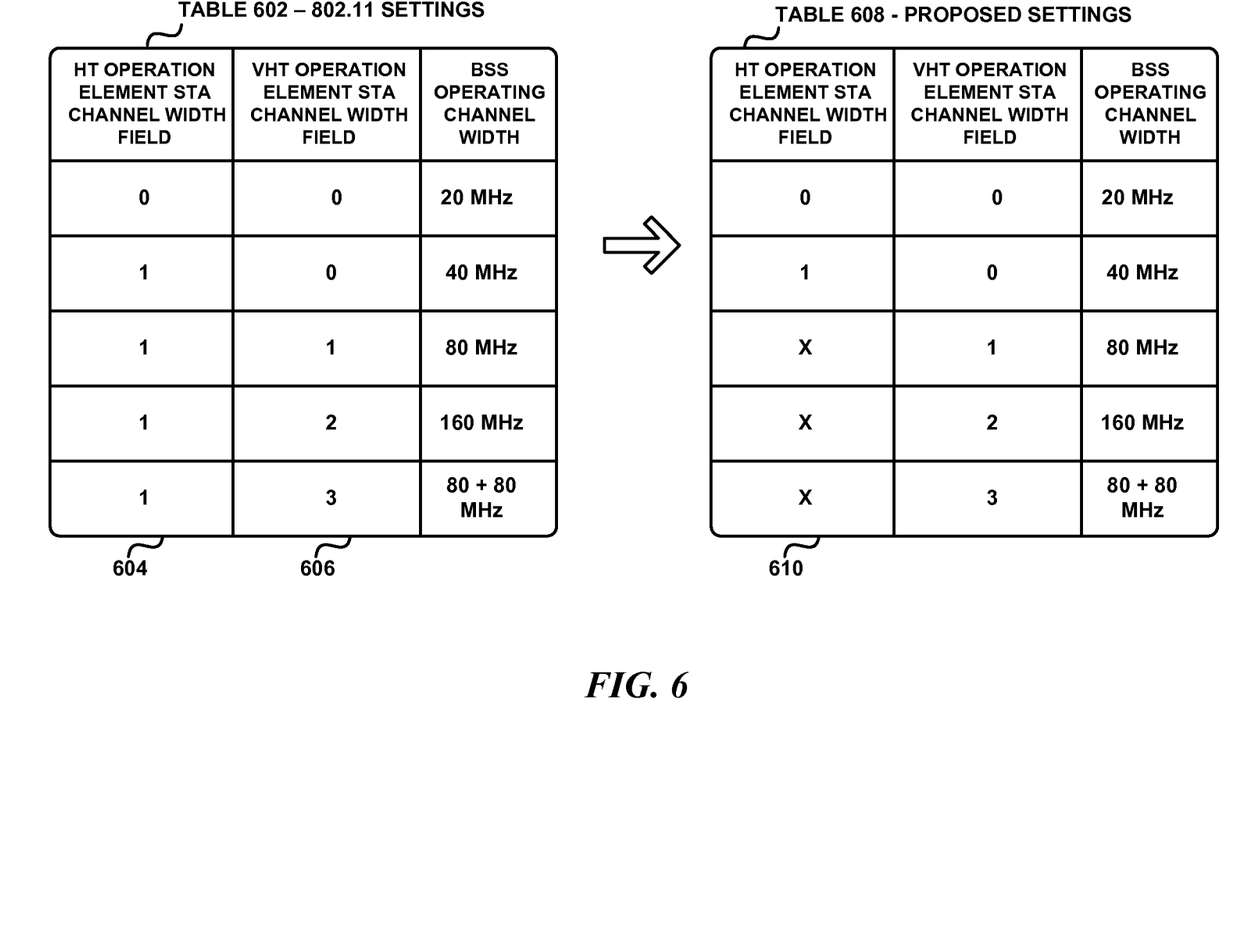
FIG. 6 is an illustration of an exemplary signaling protocol used to determine the channel capacities supported by a BSS.

Turning to FIG. 6, there is shown Table 602 which includes the settings for the STA channel width field of the HT Operation Element and the STA channel width field of the VHT Operation Element. An HT station reads the settings in column 604 of Table 602 to determine the channel widths supported by a BSS. A VHT station reads the settings in columns 604 and 606 to determine the channel widths supported by the BSS. The settings shown in Table 602 are the ones utilized by the IEEE 802.11 standards.

Table 608 shows different settings for the STA channel width field of the HT Operation Element and the VHT Operation Element. As shown in column 610 of Table 608, an HT station will interpret the bits marked 'X' in the STA channel width field of the HT Operation Element as indicating a 20 MHz channel width. A VHT station will use the bit settings in both columns to recognize the channel widths in accordance with the 802.11ac standard.

Figure 7:
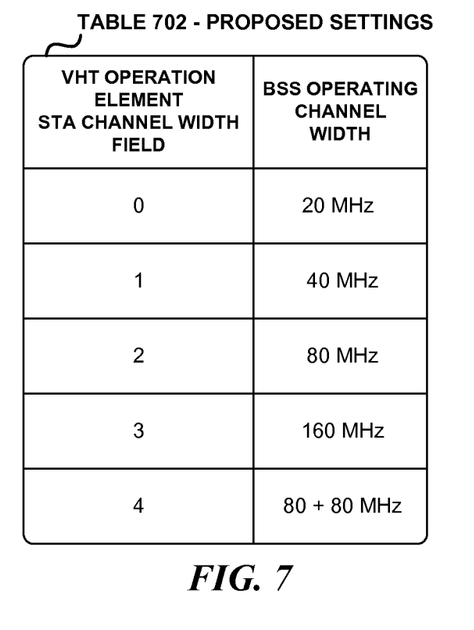
FIG. 7 is an illustration of another exemplary signaling protocol used to determine the channel capacities supported by a BSS.

Alternatively, a different structure may be used in the 802.11ac standard. FIG. 7 shows a 4-bit field that may be used instead of the combination of the HT Operation Element and VHT Operation Element. The bits settings in this field may be used to identify the channel capacity supported by a VHT BSS. This structure has the advantage of being in one field rather than split into two separate fields.

Turning to FIG. 5B, a station may receive a transmission from an access point indicating the channel widths supported by the BSS. If the station is a HT station (i.e., 802.11n device) (block 524—yes), then the HT station interprets the bit settings in the HT Operation Element marked as "X" the BSS supporting a 20 MHz channel width (block 526). If the station is a VHT station (block 524—no, block 528), then the VHT station interprets the bit settings in accordance with the 802.11ac standard.

In the second embodiment, the stations may be configured to access all channels in the 802.11ac radio band while the access points are configured to set up a BSS in accordance with FIG. 5A only. In this configuration, there would be no need to have stations interpret the bits settings shown above with respect to FIG. 5B. Rather, an access point sets up a BSS as shown above in FIG. 5A without requiring a station to interpret the bit settings in the Operation Element discussed above with respect to FIGS. 6 and 7.

In the third embodiment a device contains two channels lists. When a device operates as an access point, the device uses a channel list having the channels that are recognized by all devices, including legacy devices. As such, the channels in the channel list will be a subset of all the available channels in the radio band. When the device operates as a station, the device uses a second channel list having all the channels that are available in the radio band. The channel lists may be changed from time to time to adapt to changes in the configuration of the BSS and the devices utilizing them. The two lists may be stored in a memory of the device and are reconfigurable through a software upgrade.

Figure 8:
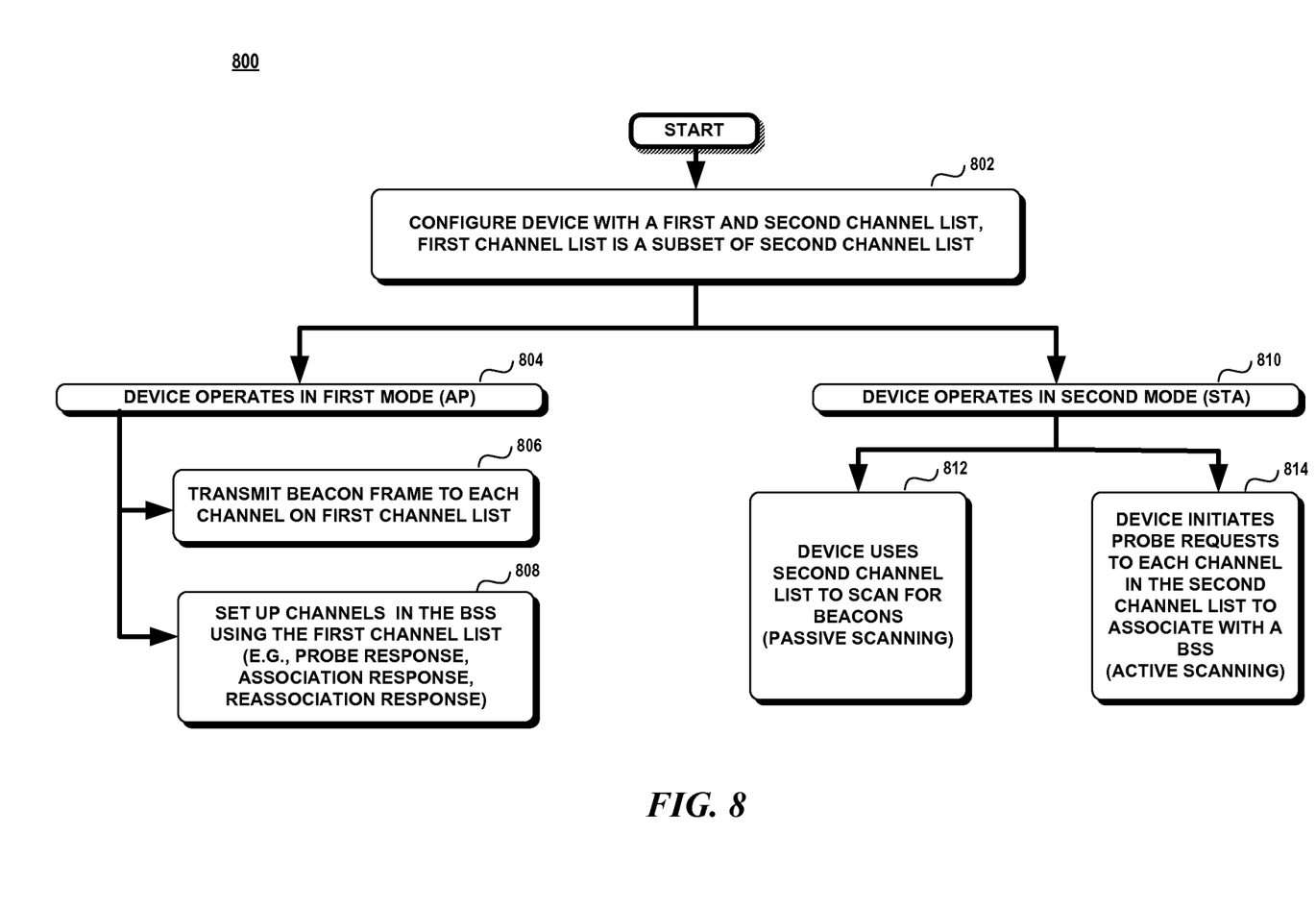
FIG. 8 is a flow diagram illustrating another embodiment of an exemplary method for maintaining interoperability with legacy devices in a wireless network.

FIG. 8 shows another exemplary method 800 to maintain interoperability within a BSS having legacy devices. It should be noted that the method 800 shown in FIG. 8 may be representative of some or all of the operations executed by one or more embodiments described herein and that the method can include more or less operations than that which is described.

A device may be configured with a first and second channel lists (block 802). Each channel list contains a listing of channel numbers used in a radio band. The first channel list is used when the device operates in a first mode, such as in the role of an access point, and the second channel list is used when the device operates in a second mode, such as in the role of a non-access point station. The first channel list contains a subset of the channels contained in the second channel list (block 802).

When the device operates in the first mode (block 804), the device transmits beacon frames to each channel in the first channel list (block 806). The device also sets the channels in the BSS using the first channel list (block 808). The device may set up channels in the BSS in a probe response, association response, and/or reassociation response (block 808).

When the device operates in a second mode (block 810), the device uses the second channel list to scan for beacons, such as in the case of passive scanning (block 812). The device may also initiate probe requests to each channel in the second channel list, as in the case of active scanning, to determine which BSS to associate with (block 814).

Figure 9:
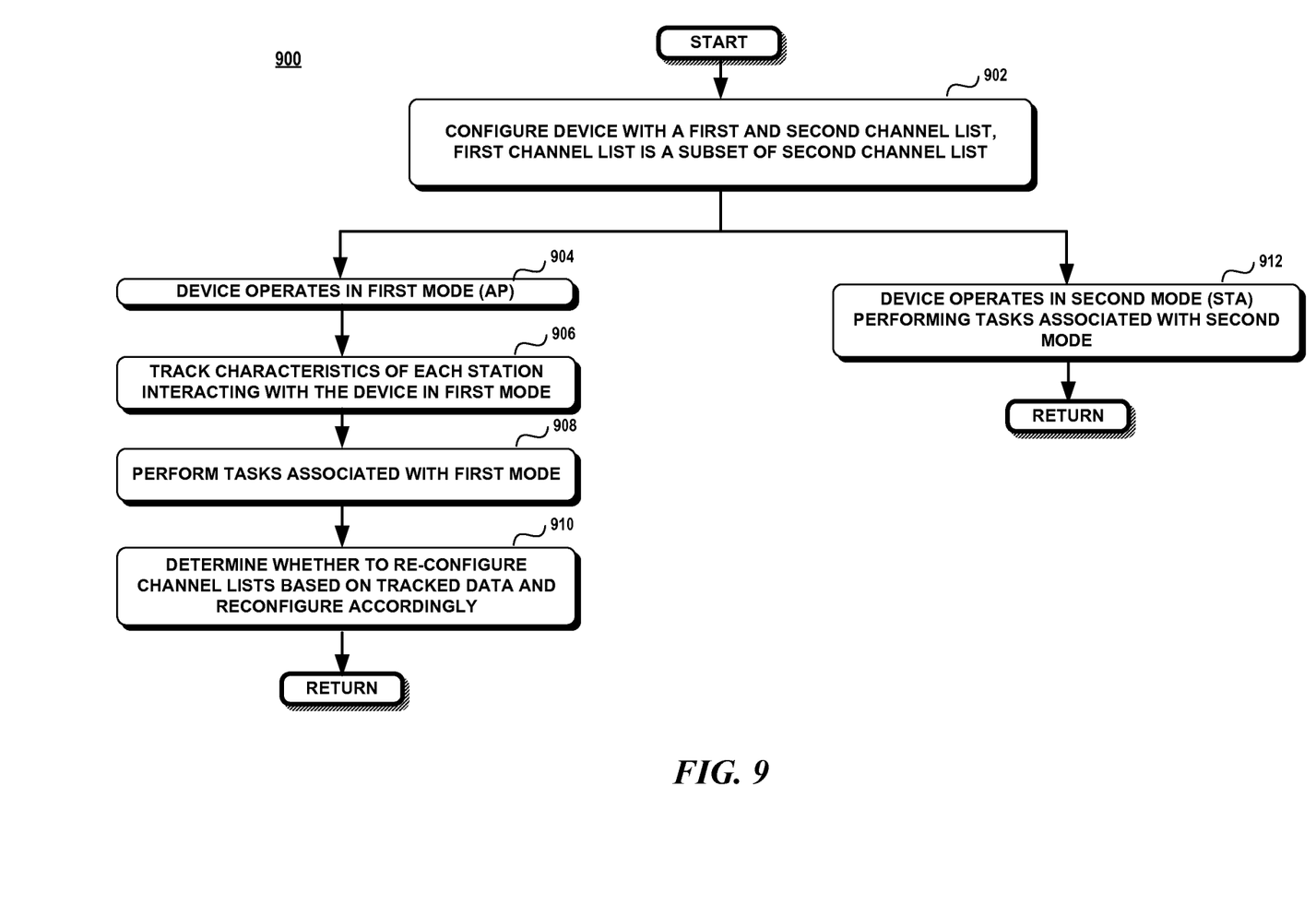
FIG. 9 is a flow diagram illustrating a third embodiment of an exemplary method for maintaining interoperability with legacy devices in a wireless network.

FIG. 9 illustrates an exemplary method 900 of a fourth embodiment that maintains interoperability within a BSS having legacy devices. It should be noted that the methods shown in FIG. 9 may be representative of some or all of the operations executed by one or more embodiments described herein and that the method can include more or less operations than that which is described.

In this embodiment, the device, when operating in a first mode as an access point, tracks characteristics of the stations interacting with the access point. The characteristics are then used to reconfigure the channel lists.

A device may be configured with a first and second channel lists (block 902). Each channel list contains a listing of the channel numbers used in a radio band. The first channel list is used when the device operates in a first mode, such as in the role of an access point, and the second channel list is used when the device operates in a second mode, such as in the role of a non-access point station. The first channel list contains a subset of the channels contained in the second channel list (block 902).

The device, when operating in the first mode, acts as an access point (block 904). The device, when operating in the second mode, may perform the tasks of a station as shown in blocks 812-814 of FIG. 8 (block 912).

When the device is configured in the first mode as an access point (block 904), the device tracks characteristics of the communications received from the stations (block 906). These characteristics may include the version of the radio protocol that the devices are operating under (e.g., 802.11a, 802.11n, 802.11ac, etc), the features that the devices have enabled, and if proprietary messages (e.g., non-compliant with the radio protocol) are being used in the communications (block 906).

The device, when operating in the first mode, then performs the tasks of an access point as shown in blocks 806-808 of FIG. 8 (block 908). The device, at certain times, may determine whether to reconfigure the channels lists based on the tracked data (block 910). The channel lists may have been configured with the expectation of there being legacy devices that may want to associate with the BSS. In order to maintain operability between the legacy devices and newer devices, the two channels lists were utilized. However, as the legacy devices become extinct, the channel lists may be reconfigured to include a more current channelization structure. In addition, the channel lists may be reconfigured based on other criteria, such as without limitation, the ratio of 802.11ac devices being associated with the BSS, the radio of devices which have certain features enabled, priority messages used in the communications, and any combination thereof. This reconfiguration may be performed dynamically in real time through the tracking and reconfiguration process shown in this embodiment.

Figure 10:
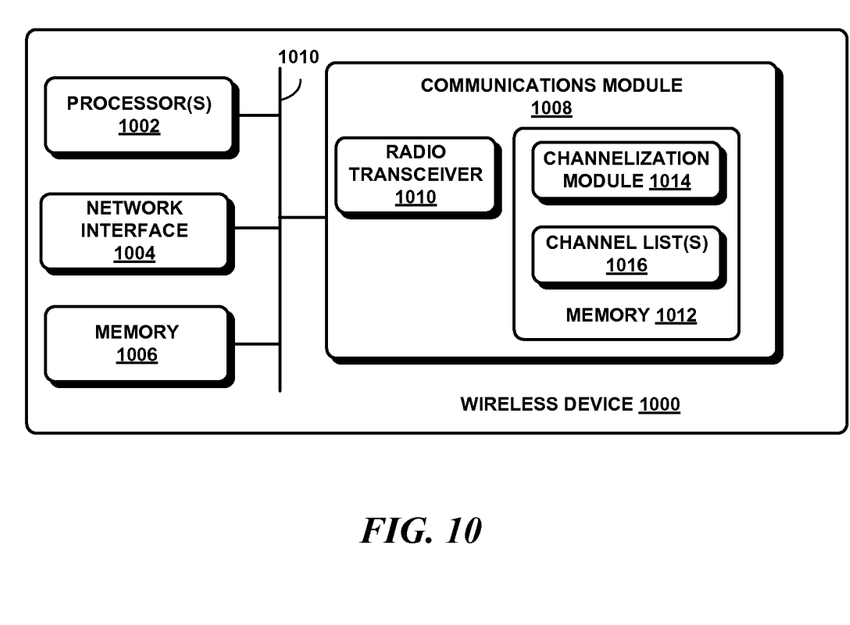
FIG. 10 is a block diagram illustrating an exemplary electronic device operating in accordance with the embodiments.

FIG. 10 shows an exemplary wireless device 100 configured to operate using the technology described herein. Various embodiments of the wireless device may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

The wireless device 1000 may be any type of electronic device capable of receiving wireless signals such as, without limitation, a mobile device, a personal digital assistant, a mobile computing device, a tablet, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof. In one or more embodiments, the wireless device 1000 is a WLAN device capable of operating in accordance with an IEEE 802.11 specification.

The wireless device 1000 may include at least one or more processors 1002, a network interface 1004, a memory 1006, and a communications module 1008 communicatively coupled through a communications link 1010 (e.g., bus). A processor 1002 may be any commercially available processor and may include dual microprocessors and multi-processor architectures. The network interface 1004 facilitates wired and/or wireless communications between the wireless device 1000 and a communications framework. The network interface 1004 includes at least one wireless network interface (e.g., WLAN interface, a BLUETOOTH® (Bluetooth) interface, a WiMAX interface, and ZigBee® interface, a Wireless USB interface, etc.).

The memory 1006 may be any machine-readable storage media that may store executable procedures, applications, and data. The machine-readable storage media pertains to non-transitory signals and not to propagated signals, such as modulated data signals transmitted through a carrier wave. Examples of a storage medium may include one or more types of machine-readable storage media capable of storing electronic data, including volatile memory or non-volatile memory, removable or non-removable memory, erasable or non-erasable memory, writeable or re-writeable memory, random access memory, read-only memory, magnetic storage, optical storage, DVD, CD, floppy disk drive, and the like. The memory 606 may also include one or more external storage devices or remotely located storage devices.

The machine-readable storage media may store various software elements, such as programs, procedures, module, applications, code segments, program stacks, middleware, firmware, methods, routines, and so on. In an embodiment, for example, a machine-readable storage medium may store executable program instructions that, when executed by a processor, cause the processor to perform methods and/or operations in accordance with the described embodiments. The executable program instructions may be implemented according to a predefined computer language, manner or syntax, for instructing a computer to perform a certain function. The instructions may be implemented using any suitable high-level, low-level, object-oriented, visual, compiled and/or interpreted programming language.

The communications module 1008 may include a radio transceiver 1012 and a memory 1014 including a channelization module 1016 and one or more channel lists 1018. The radio transceiver unit 1012 comprises a packet and a data processing unit for executing instructions that receives and transmits packets in accordance with the IEEE 802.11 radio protocol. The channelization module 1016 performs the embodiments described herein. The channel lists 1018 are the channel lists described herein with respect to FIGS. 8-9.

The memory 1014 may be any machine-readable storage media that may store executable procedures, applications, and data. The machine-readable storage media pertains to non-transitory signals and not to propagated signals, such as modulated data signals transmitted through a carrier wave. Examples of a storage medium may include one or more types of machine-readable storage media capable of storing electronic data, including volatile memory or non-volatile memory, removable or non-removable memory, erasable or non-erasable memory, writeable or re-writeable memory, random access memory, read-only memory, magnetic storage, optical storage, DVD, CD, floppy disk drive, and the like. The memory 1014 may also include one or more external storage devices or remotely located storage devices.

The machine-readable storage media may store various software elements, such as programs, procedures, module, applications, code segments, program stacks, middleware, firmware, methods, routines, and so on. In an embodiment, for example, a machine-readable storage medium may store executable program instructions that, when executed by a processor, cause the processor to perform methods and/or operations in accordance with the described embodiments. The executable program instructions may be implemented according to a predefined computer language, manner or syntax, for instructing a computer to perform a certain function. The instructions may be implemented using any suitable high-level, low-level, object-oriented, visual, compiled and/or interpreted programming language. The channelization module 1016 and the channel lists 1018 may be implemented as a software element.

In accordance with another embodiment of the present disclosure, the regulatory domain extension register (or another configuration register) of a wireless device is used to define whether the use of channel 144 is supported by the device. For example, bit [5] of the regulatory domain extension register of a wireless device may be set to: (a) a logic 0 value to indicate that the device is not enabled to use channel 144 in the FCC domain; or (b) a logic 1 value to indicate that the device is enabled to use channel 144 in the FCC domain (in the US only).

In one embodiment, bit [5] of the regulatory domain extension register (which is hereinafter referred to as the "channel 144 indicator bit") is programmed during manufacturing. Thus, a manufacturer can set the channel 144 indicator bit to a logic 0 value for devices that have already been certified by the FCC without the use of channel 144 (e.g., existing OEM products using legacy 802.11n chips, or existing OEM products using 802.11ac chips that have previously been certified by the FCC as not using channel 144.) New wireless access point (AP) devices, which have not yet been certified by the FCC, may be provided with a channel 144 indicator bit set to either a logic 0 value or a logic 1 value, as determined by the manufacturer. In one embodiment, new wireless AP devices are provided with a channel 144 indicator bit set to a logic 0 value by default, with an option to change the channel 144 indicator bit to a logic 1 value during manufacturing should the manufacturer choose to do so. The channel 144 indicator bit cannot be changed after manufacturing. New wireless client devices, which have not yet been certified by the FCC, may be provided with a channel 144 indicator bit set to a logic 1 value, thereby allowing these new wireless client devices to use channel 144 (and therefore operate using all of the channels specified by the 802.11ac standard) if the software (SW) running on top of the hardware (HW) chooses to make use of channel 144. It is possible that while the HW is able to support channel 144 (channel 144 indicator bit set to logic value of 1), the SW chooses not to make use of channel 144. Hence, channel 144 will be utilized only if both the HW (as indicated by the channel 144 indicator bit set to logic value of 1) and the SW are capable and configured to use channel 144.

A wireless AP device having a channel 144 indicator bit set to a logic 0 value is not allowed to set up a BSS of any bandwidth (20/40/80 MHz) using channel 144 as the primary 20 MHz channel, and is not allowed to set up a BSS having a 40/80 MHz bandwidth using channel 140 as the primary 20 MHz channel. A wireless AP device having a channel 144 indicator bit set to a logic 1 value, and SW configured appropriately, is allowed to use all possible channels specified by the 802.11ac standard to set up a BSS.

A wireless client device having a channel 144 indicator bit set to a logic 0 value will not scan channel 144 to become associated with another wireless device. If a wireless client device having a channel 144 indictor bit set to a logic 0 value detects a BSS with a 40/80 MHz bandwidth using channel 140 as the primary 20 MHz channel, then this wireless client device will associate in this BSS, accessing channel 140 in HT20/VHT20 mode. A wireless AP device having a channel 144 indicator bit set to a logic 1 value will scan channel 144 to become associated with another device, and will associate with a detected BSS using the maximum possible bandwidth.

In accordance with another embodiment, a wireless device operating as a software enabled access point (SoftAP) is not allowed to use channel 144 when operating in an AP mode if the wireless device does not have appropriate certification to detect radars (e.g. Dynamic Frequency Selection (DFS) Master certification from the FCC) even if the channel 144 indicator bit is set to a logic 1 value. In yet another embodiment, a wireless device operating as a Wi-Fi Direct client will not advertise channel 144 in a supported channel list unless the wireless device has obtained appropriate certification to detect radars. However, if a corresponding Wi-Fi Direct group owner (GO) requests moving to channel 144, then the wireless device may follow the request and use channel 144. In yet another embodiment, a Tunneled Direct Link Setup (TDLS) device may be controlled in the same manner described above for a Wi-Fi Direct device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for communicating data within a wireless network, the method comprising:
    configuring a first wireless device to operate in a first mode and a second mode, the first mode operating in accordance with a radio protocol and the second mode operating in accordance with the radio protocol;
    generating a first channel list including a plurality of channels supported in a first version of the radio protocol;
    generating a second channel list including a plurality of channels supported in one or more legacy versions of the first version of the radio protocol, the second channel list including at least a subset of the channels in the first channel list;
    scanning for communications from other wireless devices on channels from the first channel list when the first wireless device operates in the second mode; and
    setting up communications within the wireless network using channels only from the second channel list when the first wireless device operates in the first mode.

2. The method of claim 1, wherein the first channel list includes channels operating within the IEEE 802.11ac channel configuration.

3. The method of claim 1, wherein the second channel list includes channels operating within the IEEE 802.11n channel configuration.

4. The method of claim 1, wherein the second channel list includes channels operating within the IEEE 802.11a channel configuration.

5. The method of claim 1, wherein the first wireless device operates as a station in the second mode and the first wireless device operates as an access point in the first mode.

6. The method of claim 1, wherein the first channel list contains channel 144 and the second channel list excludes channel 144.

7. The method of claim 1, wherein the radio protocol is IEEE 802.11.

8. The method of claim 1, wherein the first version of the radio protocol is IEEE802.11ac.

9. The method of claim 1, wherein the legacy versions include IEEE 802.11a and IEEE 802.11n.

10. The method of claim 1, further comprising:
setting up communications within the wireless network by avoiding using channel 144 as a primary channel for a wireless device requesting support for a 20 MHz channel.

11. The method of claim 1, further comprising:
setting up communications within the wireless network by avoiding using channel 144 as a secondary channel for a wireless device requesting support for a 40 MHz channel and a 80 MHz channel.

12. The method of claim 1, further comprising:
tracking characteristics of wireless devices associating with the wireless network; and
adjusting the channels in a select one of the first channel list or the second channel list based on the characteristics.

13. The method of claim 1, further comprising:
adjusting the channels in the second channel list as one or more additional channels are supported by a different version of the radio protocol.

14. A radio device, comprising:
a communications module including a radio transceiver and a memory, the memory including a channelization module and a first channel list and a second channel list, the channelization module having instructions that when executed by the radio transceiver:
operates in a first mode using the first channel list to set up communications within a wireless network;
operates in a second mode using the second channel list to scan for communications within a wireless network, the first mode operating in accordance with a radio protocol and the second mode operating in accordance with the radio protocol, the second channel list including at least a subset of the channels in the first channel list, the first channel list including a plurality of channels supported in a first version of the radio protocol, the second channel list including a plurality of channels supported in a one or more legacy versions of the radio protocol;
scans for communications from other radio devices on channels from the first channel list when the radio device operates in the second mode; and
sets up communications within the wireless network using channels only from the second channel list when the radio device operates in the first mode.

15. The radio device of claim 14, wherein the first channel list includes channels operating within the IEEE 802.11ac channel configuration.

16. The radio device of claim 14, wherein the second channel list includes channels operating within the IEEE 802.11n channel configuration.

17. The radio device of claim 14, wherein the second channel list includes channels operating within the IEEE 802.11a channel configuration.

18. The radio device of claim 14, wherein the radio device operates as a station in the second mode and the radio device operates as an access point in the first mode.

19. The radio device of claim 14, wherein the first channel list contains channel 144 and the second channel list excludes channel 144.

20. The radio device of claim 14, wherein the radio protocol is IEEE 802.11.

21. The radio device of claim 14, wherein the first version of the radio protocol is IEEE802.11ac.

22. The radio device of claim 14, wherein the legacy versions include IEEE 802.11a and IEEE 802.11n.

23. The radio device of claim 14, the communications module having further instructions that when executed on a radio transceiver:
sets up communications within the wireless network by avoiding using channel 144 as a primary channel for a wireless device requesting support for a 20 MHz channel.

24. The radio device of claim 14, the communications module having further instructions that when executed on a radio transceiver:
sets up communications within the wireless network by avoiding using channel 144 as a secondary channel for a wireless device requesting support for a 40 MHz channel and a 80 MHz channel.

25. The radio device of claim 14, the communications module having further instructions that when executed on a radio transceiver:
tracks characteristics of radio devices associating with the wireless network; and
adjusts the channels in a select one of the first channel list or the second channel list based on the characteristics.

26. The radio device of claim 14, the communications module having further instructions that when executed on a radio transceiver:
adjusts the channels in the first channel list as one or more additional channels are supported by a different version of the radio protocol.

27. A non-transitory machine readable storage medium, comprising:
a first set of processor executable instructions that when executed on a processor:
operates a wireless device in a first mode using a first channel list to set up communications within a wireless network;
operates the wireless device in a second mode using a second channel list to scan for communications within a wireless network, the first mode operating in accordance with a radio protocol and the second mode operating in accordance with the radio protocol, the second channel list having at least a subset of the channels in the first channel list, the first channel list including a plurality of channels supported in a first version of the radio protocol, the second channel list including a plurality of channels supported in a one or more legacy versions of the radio protocol;
scans for communications from other wireless devices on channels from the first channel list when the first wireless device operates in the second mode; and
sets up communications within the wireless network using channels only from the second channel list when the wireless device operates in the first mode.

28. The non-transitory machine readable storage medium of claim 27, wherein the first channel list includes channels operating within the IEEE 802.11ac channel configuration.

29. The non-transitory machine readable storage medium of claim 27, wherein the second channel list includes channels operating within the IEEE 802.11n channel configuration.

30. The non-transitory machine readable storage medium of claim 27, wherein the second channel list includes channels operating within the IEEE 802.11a channel configuration.

31. The non-transitory machine readable storage medium of claim 27, wherein the wireless device operates as a station in the second mode and the wireless device operates as an access point in the first mode.

32. The non-transitory machine readable storage medium of claim 27, wherein the first channel list contains channel 144 and the second channel list excludes channel 144.

33. The non-transitory machine readable storage medium of claim 27, wherein the radio protocol is IEEE 802.11.

34. The non-transitory machine readable storage medium of claim 27, wherein the first version of the radio protocol is IEEE802.11ac.

35. The non-transitory machine readable storage medium of claim 27, wherein the legacy versions include IEEE 802.11a and IEEE 802.11n.

36. A method for communicating within a wireless network, the method comprising:
configuring the wireless network to operate with a first set of wireless devices and a second set of wireless devices, the first set of wireless devices operating with a radio protocol and the second set of wireless devices operating with the radio protocol, the first set of wireless devices configured to operate with a first version of the radio protocol and the second set of wireless device configured to operate with at least one legacy version of the radio protocol, the first version of the radio protocol including at least one additional channel not supported by each legacy version; and
setting up at least one operating channel for a wireless device from the second set of wireless devices configured to operate with the at least one legacy version, the operating channel excluding the at least one additional channel.

37. The method of claim 36, further comprising:
receiving by a second wireless device in the second set and a third wireless device in the first set, a communication indicating a list of supported channel widths from a first wireless device in the first set, the list of supported channel widths appearing to the second wireless device as being compatible with the second version of the radio protocol and the list of supported channel widths appearing to the third wireless device as being compatible with the first version of the radio protocol.

38. The method of claim 36, wherein the radio protocol is IEEE 802.11.

39. The method of claim 36, wherein the first version of the radio protocol is IEEE 802.11ac.

40. The method of claim 36, wherein the legacy version of the radio protocol is IEEE 802.11n.

41. The method of claim 36, wherein the legacy version of the radio protocol is IEEE 802.11a.

42. The method of claim 36, wherein the at least one additional channel is channel 144.

* * * * *